Nov. 18, 1958

J. S. SENESKY 2,860,658

GAS PRESSURE REGULATOR

Filed Nov. 9, 1953

INVENTOR
JOHN S. SENESKY

ATTORNEY

United States Patent Office 2,860,658
Patented Nov. 18, 1958

2,860,658
GAS PRESSURE REGULATOR

John S. Senesky, Somerville, N. J., assignor to Air Reduction Company, Incorporated, New York, N. Y., a corporation of New York Application November 9, 1953, Serial No. 390,886

3 Claims. (Cl. 137—505.37)

This invention relates to gas pressure regulators and has particular utility in the regulation of the pressure of flows of gaseous oxygen or acetylene to points of use, such as an oxy-acetylene welding torch.

Many commercial regulators which are used to maintain oxygen and other gases at a certain pressure over a range of flows depend on the well-known valve construction which includes a movable valve seat and nozzle-type orifice against which the seat is pressed to effect a seal. In many such regulators, a diaphragm is exposed at one side to the outlet pressure of the gas and controls the valve which, in turn regulates the flow of gas from the inlet side of the regulator to the outlet side in such a way as to maintain the outlet pressure of the gas at a substantially constant predetermined value.

The nozzle-type orifice is constructed so that there is a projecting annulus or nozzle onto which a deformable annular member of the movable valve seat or orifice sealing means is pressed. It is required that the alignment of the nozzle and the valve seat be maintained within close limits so that the impression in the deformable member of the valve seat always mates with the nozzle and hence the possibility of leakage due to reorientation is avoided. Sometimes, however, the alignment is not maintained and a leakage problem results since the impression in the valve seat does not mate with the nozzle. In any event, the fabrication of the nozzle-type regulator is complicated by the alignment requirement; and, of course, such a construction is relatively expensive and is not easily altered or repaired.

Other difficulties have been encountered in pressure regulators of the indirect or inverse type (valve closing member is on the high pressure side of the valve) which are constructed so as to be "end-connected." The term, "end-connected" regulator, is used herein to refer to inverse-type regulators in which the inlet gas passage in the regulator is coaxial to the axis of the valve passage, such as is the case with the regulator illustrated herein which is normally disposed so as to be connected at the bottom thereof. This arrangement is in contrast to regulators in which the incoming gas passage is perpendicular or at an appreciable angle to the axis of the valve passage or, stated differently, the instant arrangement is in contrast to regulators in which the inlet passage is not aligned with the axis of the valve passage. Of prime consideration in such regulators is an effective gas-tight sealing arrangement at the regulator parts to which the end connection is made. Such an end-connecting regulator having parts which can be easily fabricated and assembled is also highly desirable. Furthermore, since in the inverse type of regulator the valve closing means is upstream of the valve passage and so is adjacent the end connection, it is apparent that a compact, easily-fabricated arrangement of valve and end connection would also be advantageous.

It is an object of this invention to provide an improved gas pressure regulator and valve structure therefor which avoids the leakage problem and other disadvantages encountered in many commercial nozzle-type pressure regulators.

Another object is to provide an improved regulator by suitably combining an O ring valve construction with a damped, pressure-responsive diaphragm construction so as to give improved performance characteristics, such as improved regulation over a large range of flows.

An additional object is to provide an improved "end-connected" regulator which expression, as above explained, is intended to mean a regulator in which the inlet passage of the gas in the regulator is axially aligned with the axis of the valve passage.

A further object is to provide an improved pressure regulator which is relatively inexpensive to manufacture, will give trouble-free service for extended periods and is readily susceptible to repair and alteration.

The accomplishment of the foregoing objects and others, along with the features and advantages of the invention, will be apparent from the following description and the accompanying drawing in which.

Figure 1:
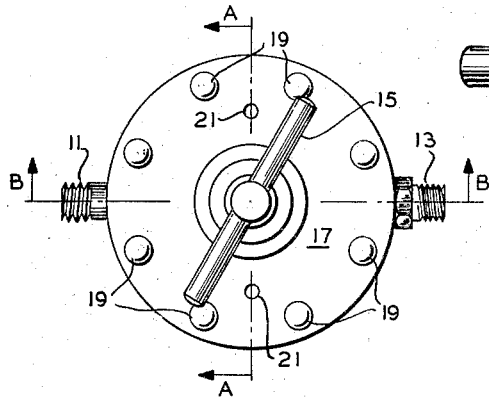
Fig. 1 is a top elevation on a reduced scale of a regulator, embodying the instant invention.

In Fig. 1, the pipe 11, onto which a pressure gauge (not shown) is attached, is shown extending to the left from the regulator. The outlet 13 for the gas being regulated extends from the opposite side of the regulator. The hand screw 15 for adjusting the diaphragm spring overlies the casing 17 which houses the diaphragm spring. This casing 17 is attached to the lower part of the regulator by means of the fasteners 19. Two vents 21 in the casing, for keeping the space within the casing 17 at atmospheric pressure, appear in Fig. 1 adjacent to the ends of the handle of the hand screw 15.

Figure 2:
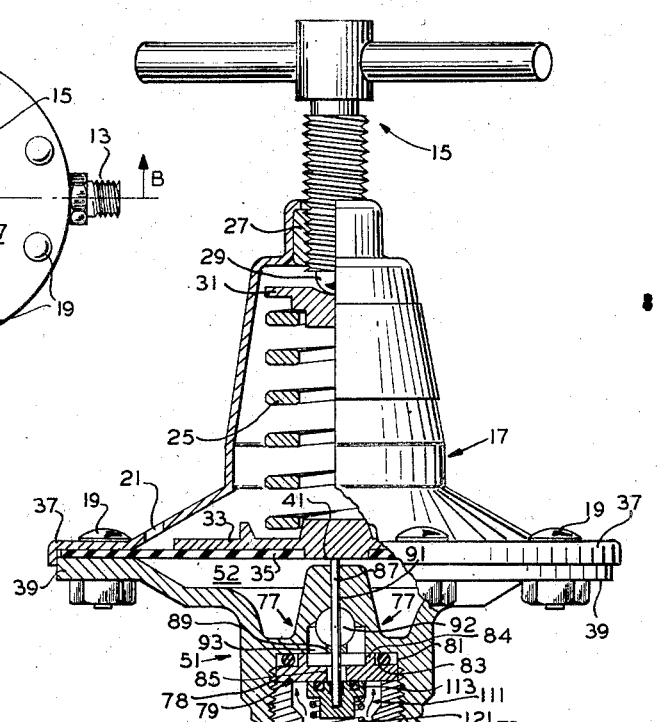
Fig. 2 is a full-size, partially cross-sectioned showing taken along the line A—A of Fig. 1.

In Fig. 2, it can be noted how one of the vent passages 21 passes through the lower, inclined portion of the bell-shaped casing 17. The upper conical-like portion of the casing 17 surrounds the diaphragm spring 25 and merges into a small diameter, cylindrical portion which contains the interiorly-threaded, annular element 27. Hand screw 15 is threaded through element 27. The lower rounded tip 29 of the hand screw fits into a depression in the upper, diaphragm-spring retainer 31. The lower end of the diaphragm spring 25 fits into the groove formed on the upper side of the lower spring retainer 33. The lower spring retainer 33 has a large diameter and its lower face bears against a large portion of the diaphragm 35. Diaphragm 35 is retained in a gas-tight manner at its periphery between the flange 37 of the spring casing 17 and the flat flange 39 of the lower body part by means of fasteners 19, mentioned above.

The diaphragm 35 is made from a suitable material, such as rubber, and is positioned on the lower spring retainer 33 by means of the cylindrical projection 41, depending from the center of this retainer. The projection 41 fits into a central hole in the diaphragm. The diaphragm is permanently attached to the lower spring retainer or diaphragm plate 33 by an inter-facial bond, such as can be effected by vulcanization. A somewhat similar construction is shown in the United States Patent No. 2,061,794, issued to Deming on November 24, 1936. The plate part of the lower spring retainer 33 is of such size that only a relatively small annular part of the diaphragm is left without backing.

Referring now to the parts of the regulator which are below the diaphragm 35, it can be seen that the abovementioned flange 39 is an integral part of a large body part 51. The upper section of this body part is formed with a dish-like recess or diaphragm cavity 52 which defines, in part, the diaphragm chamber while the lower section or other end is tubular. The interior of this tubular section can be referred to as a cylindrical cavity. The lowest portion of body part 51 is exteriorly threaded and terminates in an annular horizontal edge 53. This portion also has a smooth bore 55 having a depth which is about equal to the vertical length of the exterior threads.

The tubular gas inlet member 61 which fits into bore 55 has two main portions. The smaller, lower cylindrical portion 63 is threaded interiorly and is thus suitable for connection by conventional means to a gas supply, such as a bank of oxygen cylinders. The larger and inner tubular portion 65 has an exterior ridge 67 between two surfaces having the same diameter. These diameters are about the same as the diameter of bore 55, abovementioned. With this construction, inlet member 61 is inserted into bore 55, causing ridge 67 to abut the annular transverse edge 53 formed at the bottom of body part 51. Inlet member 61 is retained in bore 55 by means of the large nut 71 which slips over the lower part of inlet member 61 and threads onto threaded portion of body part 51. This assembling is completed when the urging of the lower, inwardly extending flange 73 of nut 71 against ridge 67 causes ridge 67 to abut the annular edge 53. The inner annular end of inlet member 61 is exteriorly recessed at the outer edge and receives an O ring 75 which is made of rubber or other similar rubber-like materials. This O ring contacts the walls of the recess and the wall of bore 55 so as to provide a gas-tight seal.

Of course, it is apparent that, prior to the foregoing assembling of the lower external parts, the internal parts are inserted in the space below the transversely-drilled central cross wall 77 of the body part 51. The innermost element in the inner, partially-threaded cavity 78 in body part 51 is the orifice or valve plate 79 which has a rubber O ring 81 positioned in an upper, peripheral recess 83 formed in part by annular ridge 84. This O ring is squeezed laterally to provide another gas-tight seal. Orifice plate 79 has a central valve passage and reference numeral 85 is applied thereto. The thrust pin 87 extends through orifice 85 and the two guideways 89, 91 formed in portions of the cross wall 77 of the body part 51. The construction of cross wall 77 and body part 51, perpendicular in respect to the showing in Fig. 2, is shown in Fig. 3 which is a view along the line B—B of Fig. 1.

Figure 3:
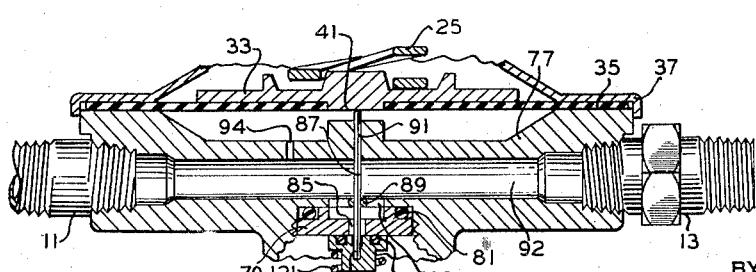
Fig. 3 is a full-size, broken view in cross section of the portion of the regulator which is adjacent the valve and is taken along the line B—B of Fig. 1.

In Fig. 3 it can be seen that the straight cross passage 92 leading to the gauge connection 11 and the gas outlet connection 13 divides the ridged cross wall 77 of body part, at the axial center of the cross wall 77, into the two central cross portions which have the guideways 89 and 91 for thrust pin 87. Four vertical equi-spaced, intermediate passages 93 provide the means for communication between the space immediately below the cross wall 77 and the transverse gas outlet passage 92 whereby oxygen, for instance, leaving the axial orifice passage of the plate 79 can flow into cross passage 92 and hence into outlet connection 13. The upper guideway 91 extends through the centrally-raised part of the axial cross wall 77 and hence is appreciably longer than the lower guideway 89 in cross wall 77. The ridged feature in the diaphragm cavity can be referred to as a radial transverse ridge.

The restricted passage 94 which extends through the upper section of cross wall 77 (shown at the left of thrust pin 87 in Fig. 3) serves to put the lower side of the diaphragm under the influence of the pressure of the gas in cross passage 92 in a delayed manner or out of phase with the actual pressure changes in passage 92. This restricted passage 94 damps the effect of pressure and hence prevents chattering or rapid closing and opening of the regulator when rapid changes in pressure occur, as is well known in the art. The United States Patent No. 2,338,760 issued to Deming on January 11, 1944, has a teaching of this feature. It will be evident that the size of the opening 94 depends upon the volume of the space under the diaphragm 35.

It is to be noted that the top of thrust pin 87 abuts the central depending portion 41 of the metallic, lower diaphragm spring retainer 33 and is not rigidly attached thereto.

Referring again to Fig. 2 and the internal parts of the regulator, it can be observed that the orifice closing or sealing assembly 111 is associated with the lower end of the thrust pin 87. The orifice closing assembly or valve member 111 has an O ring 113 mounted therein so that, when assembly 111 is urged upwardly by spring 121, the O ring will be pressed against the flat annular surface of orifice plate 79 which surrounds orifice 85. This flat annular surface can be referred to as a valve seat. In this manner, the valve mechanism will be closed and a gas, such as oxygen, will not flow around the orifice closing assembly, over the O ring, and through the orifice passage. Spring 121 is supported at its bottom by orifice plate holder 123 which, as suggested by its name, also retains the orifice plate 79 in place. Holder or cup-like hollow member 123 is threaded into cavity or bore 78 of the body part 51 by means of a nut head 125 formed at the bottom of holder 123. Four screened, transverse passages 127 provide the means for filtering and admitting the gas from the annular space or gas inlet passage formed between inlet member 61 and holder 123 to the interior bores formed in orifice plate holder 123. The upper one of these bores in holder 123 is larger than the lower bore into which the screened passages 127 open in order to accommodate the orifice closing assembly. With this arrangement, an annular passage is formed by the upper bore and the peripheral parts of orifice closing assembly 111. It is to be noted that, since the orifice plate holder 123 has its upper annular end bearing against the peripheral part of the bottom face of the orifice plate, the plate holder can be threaded inwardly only until the annular ridge 84 (formed on the top face of the orifice plate) abuts the flat, transverse portion of the bottom of cavity 78 which is adjacent the vertical passages 93. It is to be appreciated that orifice plate 79 can be easily removed and replaced by another, if necessary or desired, due to the foregoing construction. Another noteworthy advantage resides in the fact that, by means of instant construction including tubular inlet 61, orifice plate holder 123 and associated structure, an improved end-connected pressure regulator of the inverse type has been provided.

Figure 4:
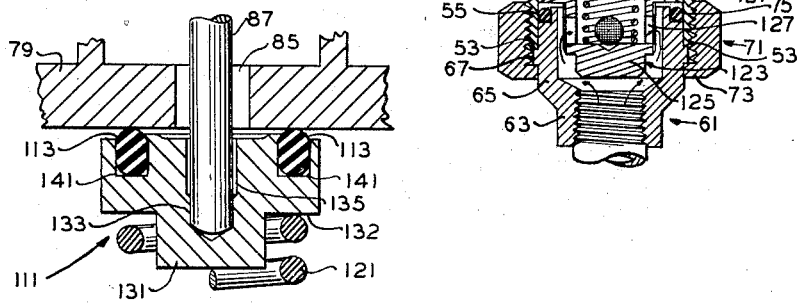
Fig. 4 is an enlarged cross-sectional showing of the valve elements and shows how the thrust pin fits into the O ring holder of the valve.

Fig. 4 shows details of the valve mechanism including the orifice closing assembly 111 and the fit of the thrust pin 87 into this assembly. The depending cylindrical portion 131 of the O ring holder 132 provides the means for retaining the top of the spring 121 in place. The recess in the top part of the O ring holder 132 provides the means for loosely receiving the thrust pin 87 in the holder 132 and is comprised of inner small bore 133 and the larger outer bore 135. The diameter of the upper bore is 0.101″ while the lower bore diameter is 0.096″. The depth of the upper bore 135 is about 0.109″ while the depth of the lower bore is about 0.062″. Since the bottom end of the thrust pin (0.093″ in diameter) is received in a bore which has a diameter of about 0.096″ and the bore is only about 0.062″ in depth, it is to be appreciated that some slight rocking of the O ring in relation to the flat surface against which it abuts is possible. This feature is deliberately incorporated and provides the cooperating means for assuring a gas-tight seal regardless of certain structural variations or other factors which might tend to prevent proper abutment of the projecting part of the O ring against the flat transverse surface of the orifice plate.

The thrust pin is made of Monel metal and has a polish finish. Its diameter is 0.093″, as above-mentioned. This pin is straight within 0.002" in relation to its length of about 1.144". The guideways 89 and 91 for the thrust pin, above mentioned, each have a diameter of 0.096" which is the same as the lower bore 133.

It is to be noted that the thrust pin is relatively loosely guided axially at two locations, guideways 89 and 91, and that guideway 91 is quite long in relation to the length of the thrust pin. Also worthy of note is the feature that guideway 89 is relatively close to the valve orifice with the result that the O ring is axially centered. It is also to be noted that the O ring holder of the orifice closing assembly has no guide means below it and hence fabrication and assembly are facilitated.

Fig. 4 also illustrates clearly how the O ring is retained. By spinning over some of the central portion of the O ring holder towards the groove 141 which receives the O ring, means for effectively retaining the O ring in the groove 141 during operation is provided. The final positioning of the O ring in the groove 141 is such that it projects about .070" above the spun-over part of the holder. The inner edge of the groove 141 has a diameter of about 0.250". It will be understood that the Fig. 4 showing is the actual form of O ring 113 and that the showings of this ring in Figs. 2 and 3 are schematic.

The basic operation of the instant regulator is believed to be readily apparent to one skilled in the art. Thus, the adjustment of the diaphragm spring 25 by means of hand screw 15 is a well-known expedient in regulators for adjusting the pressure of the gas delivered through connection 13 to some predetermined valve. Thereafter, the gas, admitted through the tubular inlet 61, will pass through the passage 85 when the forces exerted by gas in the space below the diaphragm and spring 121 are insufficient to resist the downwardly urging of the diaphragm spring 25 through thrust pin 87, as will occur when the gas is used. After the pressure builds up in passage 92 and then, after a phase lag, in chamber 52 below the diaphragm, the urging of the gas will move the diaphragm up in opposition to the diaphragm spring 25; and, since the restraint previously exerted by the thrust pin-diaphragm structure will not be operative, the O ring valve closing assembly will move upwardly, being guided by the thrust pin 87, due to the urging spring 121. The seal thus effected will, of course, be aided in the illustrated regulator by the force exerted by the inlet gas on the O ring holder. This type of regulator is known as the indirect type of regulator and is to be contrasted with the direct type regulator. The direct type regulator is characterized by the fact that the valve closing element closes against the high pressure of the gas, by cooperating with the outlet of the valve passage connecting the high and low pressure spaces of the regulator.

An outstanding operational feature should be noted, with reference to Fig. 4. Since the lower end of the thrust pin is received by the O ring holder so that the holder can rock slightly about its vertical axis, it is possible for the uppermost projecting part of the O ring to move easily into parallel relation with the opposing flat annular surface and to effect a seal when pressed against the flat surface. Thus, since the thrust pin purposely fits loosely in the recess and so some play between the members is possible, the movement of the thrust pin will merely guide the O ring holder axially; yet a slight pivoting within small limits will be permitted. In this manner, the O ring will be accommodated squarely against the bottom face of the orifice plate regardless of small variations in alignment which might occur as a result of the O ring holder being displaced laterally. This feature can be referred to as a self-accommodating O ring valve mechanism.

A significant advantage of the foregoing, self-accommodating valve mechanism resides in the fact that it is relatively easily fabricated, gives leakage-free operation for relatively prolonged periods and is easily repaired. The observed improvement in pressure regulation over large flow ranges is attributed to the combination of the damped, diaphragm construction, the self-accommodating valve mechanism, and the relatively frictionless guiding of the thrust pin which operatively connects the diaphragm construction and the valve mechanism.

A further advantage exists in having the construction of the valve mechanism so that the valve orifice plate is removable. This feature, in combination with the fact that the springs can be changed, permits the regulator to be converted so as to be suitable for other desired service requirements. It is to be noted that, regardless of this convertibility feature, the use of the orifice plate with its O ring seal and its central recess (formed interiorly of ridge 83) results in the means which provides, in cooperation with the transversely-drilled body part of the regulator, an easily-fabricated structure forming the interior low pressure flow path in a regulator.

Another advantage of the instant regulator resides in the construction whereby a compact, easily-fabricated, end-connecting pressure regulator of the inverse type is provided. Thus, the parts which cooperate with the inlet end of the body part, such as the tubular inlet member 61, holder 123 and O ring seal 75, provide an advantageous gas-flow construction while permitting the connection of the regulator at its end to a gas supply. The entire construction of high pressure side including the orifice plate is fabricated and assembled with comparative ease. The absence of a nozzle-type valve and any guide means for the O ring holder in the structure providing the high pressure side accounts, in part, for this advantage. The simplicity of the thrust pin arrangement for operatively connecting the diaphragm and the valve closing means comprises a further factor contributing to ease of fabrication. It is also apparent that this end construction facilitates inspection and repair.

It is to be understood that certain features of the disclosed embodiments of the invention are merely illustrative and that one skilled in the art can make changes without departing from the invention as defined by the following claims.

I claim:

1. A pressure regulator including a body part having one end formed into a dish-like recess, said body part also having a gas outlet passage passing therethrough, said body part having its other end formed into a tubular section having a cylindrical space terminating in a flat inner transverse wall, a gas passage connecting said space and said gas outlet passage, an orifice plate positioned in said space and having an annular ridge abutting said inner transverse wall of said tubular section radially outwardly from said gas passage, said orifice plate having a diameter about equal to the transverse dimension of said cylindrical space, an O ring positioned exteriorly of said annular ridge and contacting the inner face of said plate and said wall in such a manner as to provide a gas-tight seal, perforate means threaded into said tubular section and arranged to bear inwardly against the outer part of said plate, a tubular gas inlet structure positioned partially in said tubular section of said body part outwardly of said orifice plate and adapted to have its outer end connected to a gas supply, said tubular gas inlet structure having a peripheral recess, an O ring positioned in said peripheral recess and contacting a wall of said recess and the longitudinal wall of said tubular section in such a manner as to provide a gas-tight seal, said orifice plate having a valve passage therethrough so arranged that a gas can flow into said gas passage, closing means including a movable resilient O ring associated with said valve passage in said orifice plate for stopping any gas flow from the interior of said gas inlet structure towards the downstream opening of the passage in said orifice plate, pressure-responsive means associated with said body part and said closing means and constructed and arranged to permit gas flow through the passage in said orifice plate to said gas passage when the pressure in said gas outlet passage decreases below a predetermined value.

2. A pressure regulator including a body part having one end formed with a dish-like recess, said body part also having a central solid portion with a transverse gas outlet passage passing completely therethrough, said gas outlet passage being in communication with said recess by means of a restricted conduit, said body part having its other end formed into a tubular section having a space interiorly terminating in a flat inner transverse wall, gas passages connecting said space and said gas outlet passage, an orifice plate having a valve passage therethrough positioned transversely in said space and having an annular ridge abutting said inner transverse wall of said tubular section, an O ring positioned exteriorly of said annular ridge and contacting the inner face of said plate and said wall in such a manner as to provide a gas-tight seal, a tubular gas inlet structure positioned partially within said tubular section of said body part but outwardly of said orifice plate, said tubular gas inlet structure having a peripheral recess, an O ring positioned in said peripheral recess and contacting a wall of said recess and the longitudinal wall of said tubular section in such a manner as to provide a gas-tight seal, said orifice plate having a passage therethrough so arranged that a gas can flow into said gas passage, means including a movable resilient O ring bearing against said plate and associated with said passage in said orifice plate for stopping any gas flow from the interior of said gas inlet structure towards the outer opening of the passage in said orifice plate, pressure-responsive means associated with said dish-like recess and said first-mentioned means and constructed and arranged to permit gas flow through the valve passage in said orifice plate to said gas outlet passage when the pressure in said central gas outlet passage decreases below a predetermined value.

3. A gas pressure regulator having a dish-like formation formed in a body part providing a cavity which is adapted to cooperate with a diaphragm to form a diaphragm chamber, a radial transverse ridge extending up from the bottom of said diaphragm cavity of said dish-like formation, said ridge having a straight outlet gas passage therethrough, said body part having an axial tubular portion extending from the bottom of the dish-like formation, a flat transverse wall axially-inwardly terminating said tubular portion whereby a cylindrical cavity results, two axial guideways aligned with each other and with the axis of the tubular body with one of said guideways extending through the upper axial part of said transverse ridge to the outlet gas passage and with the other guideway extending from said outlet passage to said cylindrical cavity, intermediate straight gas passages extending from said cylindrical cavity to said transverse passage with the openings of said passages into said cylindrical cavity being spaced slightly from the opening of said other guideway whereby a non-axial gas flow path from said cylindrical cavity to said transverse passage is provided, a valve plate having an axial valve passage positioned in said cylindrical cavity so as to be aligned with the axis of said tubular portion, said valve plate being constructed and arranged so as to provide a gas path from its valve passage to said intermediate passages, a restricted passage connecting said transverse passage and said diaphragm cavity, a diaphragm spring construction connected to said dish-like formation with the diaphragm exposed to said diaphragm cavity and constructed and arranged to exert an axial force towards said guideways when the pressure in said chamber is below a predetermined value, a thrust pin extending from said diaphragm-spring construction through said guideways and said valve passage into said cylindrical cavity, a movable rubber-like O ring positioned in an O ring holder and a spring bearing against said O ring holder, said O ring and said spring associated with said thrust pin and said valve plate and constructed and arranged to interrupt the flow of a gas towards the gas path in said valve, and means in said axial tubular position for retaining said valve plate in abutment with said flat transverse wall and for supporting said spring, said means including a gas path to said axial valve passage, and a filter device in said gas path.

References Cited in the file of this patent
UNITED STATES PATENTS

| | | |
|---|---|---|
| 399,565 | Rueff | Mar. 12, 1889 |
| 1,410,089 | Wilkins | Mar. 21, 1922 |
| 2,050,041 | Czarnecki | Aug. 4, 1936 |
| 2,161,544 | Baker | June 6, 1939 |
| 2,288,733 | Niesemann | July 7, 1942 |
| 2,343,146 | Jenkins | Feb. 29, 1944 |
| 2,645,062 | Senesky | July 14, 1953 |
| 2,674,829 | St. Clair | Apr. 13, 1954 |
| 2,678,187 | Peters | May 11, 1954 |
| 2,703,103 | Thibault | Mar. 1, 1955 |
| 2,747,834 | Meusy | May 29, 1956 |

FOREIGN PATENTS

| | | |
|---|---|---|
| 294,006 | Italy | Mar. 9, 1932 |